United States Patent
Xu et al.

(10) Patent No.: US 9,928,155 B2
(45) Date of Patent: Mar. 27, 2018

(54) AUTOMATED ANOMALY DETECTION SERVICE ON HETEROGENEOUS LOG STREAMS

(71) Applicant: NEC Laboratories America, Inc., Princeton, NJ (US)

(72) Inventors: Jianwu Xu, Lawrenceville, NJ (US); Biplob Debnath, Princeton, NJ (US); Hui Zhang, Princeton Junction, NJ (US); Guofei Jiang, Princeton, NJ (US); Nipun Arora, Plainsboro, NM (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/352,546

(22) Filed: Nov. 15, 2016

(65) Prior Publication Data

US 2017/0139806 A1    May 18, 2017

Related U.S. Application Data

(60) Provisional application No. 62/256,750, filed on Nov. 18, 2015.

(51) Int. Cl.
*G06F 9/44* (2006.01)
*G06F 11/36* (2006.01)
*G06F 11/07* (2006.01)

(52) U.S. Cl.
CPC ...... *G06F 11/3612* (2013.01); *G06F 11/0706* (2013.01); *G06F 11/0766* (2013.01); *G06F 11/3636* (2013.01)

(58) Field of Classification Search
CPC .......................................................... G06F 9/44
USPC .................................................. 717/127–130
See application file for complete search history.

(56) References Cited

U.S. PATENT DOCUMENTS

| | | | |
|---|---|---|---|
| 2009/0216624 A1* | 8/2009 | Kato .................... | G06F 11/3409 705/7.38 |
| 2011/0185055 A1* | 7/2011 | Nappier .............. | H04L 63/1433 709/224 |
| 2011/0277034 A1* | 11/2011 | Hanson ................. | G06F 21/554 726/25 |
| 2015/0007139 A1* | 1/2015 | Beauchamp ........ | G06F 11/3664 717/124 |

* cited by examiner

*Primary Examiner* — Jae Jeon
(74) *Attorney, Agent, or Firm* — Joseph Kolodka

(57) ABSTRACT

Systems and methods are disclosed for handling log data from one or more applications, sensors or instruments by receiving heterogeneous logs from arbitrary/unknown systems or applications; generating regular expression patterns from the heterogeneous log sources using machine learning and extracting a log pattern therefrom; generating models and profiles from training logs based on different conditions and updating a global model database storing all models generated over time; tokenizing raw log messages from one or more applications, sensors or instruments running a production system; transforming incoming tokenized streams are into data-objects for anomaly detection and forwarding of log messages to various anomaly detectors; and generating an anomaly alert from the one or more applications, sensors or instruments running a production system.

18 Claims, 5 Drawing Sheets

AUTOMATED ANOMALY DETECTION SERVICE ON HETEROGENEOUS LOG STREAMS

This application claims priority to Provisional Application 62/256,750, the content of which is incorporated by reference.

BACKGROUND

The present invention is related to log stream processing for applications, sensors or instruments.

Most modern day automated software's generate human readable logs for developers to understand and realize the cause of errors, or progress of transactions in the application. This is standard practice usually by developers of the application itself to assist in debugging possible scenarios that may arise in real-life. While logs are present in most-modern day systems, the scale of connected components and devices makes finding the root-cause an extremely hard search problem. The current practice of manually mining the root-cause is arduous, relies on the operators understanding of the system, and can take several man-hours.

Conventional systems for finding production bugs such as Splunk, Loggly, and ELK require manual inspection. Splunk is a search engine for traditional log inputs. These systems index all words in logs collected from production systems, and provide a Google like search capability. This is simple yet extremely powerful, as often operators can simply find root cause by searching for key-words and manually correlating causes across various sources. Loggly and ELK go a step further and provides tokenization of logs based on regular expressions given by users, or taken from a repository of commonly available regular expressions for common applications. The tokenized logs are then indexed and stored in a database, which supports search. Both of these provide real-time alerts and visualizations to the users.

SUMMARY

Systems and methods are disclosed for handling log data from one or more applications, sensors or instruments by receiving heterogeneous logs from arbitrary/unknown systems or applications; generating regular expression patterns from the heterogeneous log sources using machine learning and extracting a log pattern therefrom; generating models and profiles from training logs based on different conditions and updating a global model database storing all models generated over time; tokenizing raw log messages from one or more applications, sensors or instruments running a production system; transforming incoming tokenized streams are into data-objects for anomaly detection and forwarding of log messages to various anomaly detectors; and generating an anomaly alert from the one or more applications, sensors or instruments running a production system.

Advantages of the system may include one or more of the following. The system automatically detects anomalies in heterogeneous log sources generated by modern day devices. The system can process logs generated by sensors, computer software, or internet-of things. The system does not need any human input or previous gold standard of common patterns. The system is completely automated, and relies on unsupervised machine learning algorithms to alert the users of any anomalies in the system. Monitoring and triggering alerts is an essential "first-attack" mechanism to quickly capture problems in large-scale production software.

Furthermore it is important, to localize the symptom, and its potential causes as soon as possible. The system provides a platform that can plug-in data analytics and models and can push alerts, their potential causes using advanced machine-learning techniques. The system can run on any unmodified logs, without prior knowledge of the structure.

DESCRIPTION

An exemplary log management, processing and analytics platform called NGLA is detailed. NGLA provides a workflow for advanced log analytics. One commercial aspect of the technology is real-time alerts to the users without any input from them whatsoever, or any knowledge of the targeted system. Real-time alerts from NGLA allow operators to quickly find the presence of the bug, further advanced analytics allow for semi-automated understanding of the bug cause, which will make finding the root-cause easier. Overall this allows for faster bug-fixes, more robust software, and reduces the cost in several man-hours currently spent in reading the logs and mining the cause of the error.

Figure 1:
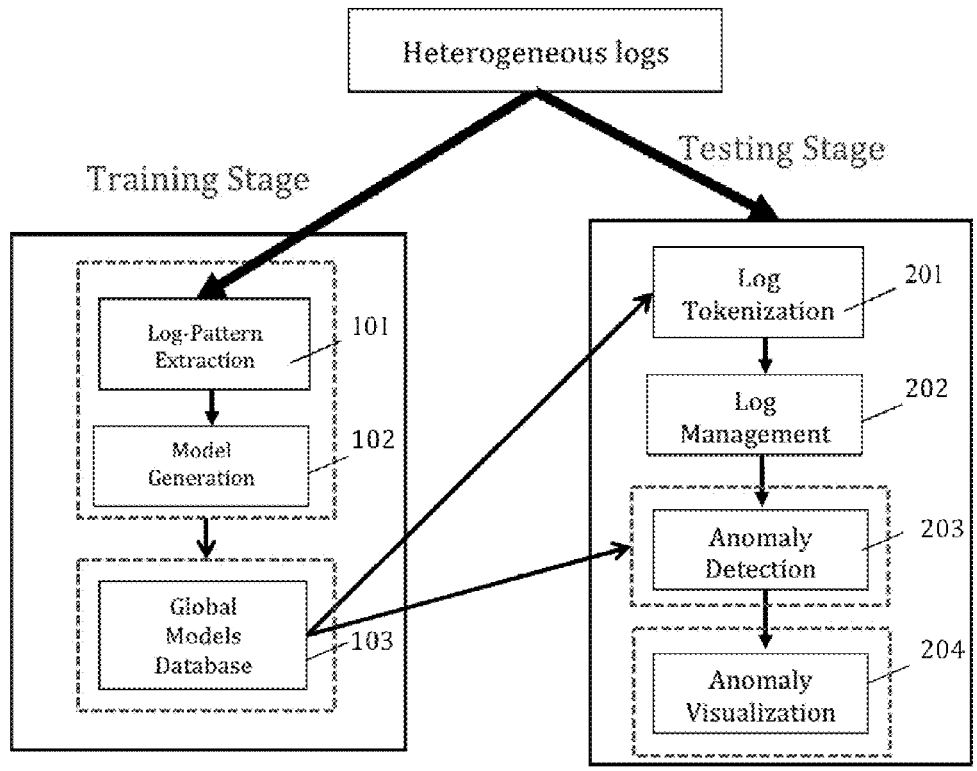
FIG. 1 shows an exemplary workflow process for NGLA.

FIG. 1 shows an exemplary workflow process for NGLA. The process presents service level components which together show a log-processing workflow, and a concrete system for dealing with heterogeneous logs, and generating meaningful alerts for the user.

The log analytics platform provides a service-oriented architecture for plugging in anomaly detection modules and models. NGLA provides a comprehensive way for modeling training log profiles (102), storing them in a Global Model Database (103), which can be queried for models required for Anomaly Detection (203). In the testing phase, we query for the regular expressions (201), tokenize incoming log streams. An analysis component (203) provides data transformations for incoming streams. The advantage of these transformations is that they can be interchangeably used for different anomaly detection algorithms. The anomaly detection algorithms can simply subscribe to a data transformation. Operation (204) shows an exemplary UI which allows for co-analysis of anomalies.

Heterogeneous log collection is performed in 100. This operation takes heterogeneous logs from arbitrary/unknown systems or applications. A log message consists of a time stamp and the text content. The data is divided into training logs—considered to be "normal" case, and testing logs.

First, Log-Pattern Extraction 101 is performed. This step automatically generates regular expression patterns from Heterogeneous log sources using Unsupervised Machine Learning. Log pattern extraction generates a regular expression for the incoming logs using unsupervised learning. Log patterns have variable fields with a wildcard pattern where each field has a keyname. The keynames can be attributed to well-known patterns, as well as unknown fields with generic names. For instance,
  a. Named Fields: timestamp, Log ID, IP Address
  b. Unknown: Pattern1String1, Pattern1Number1 etc.

Model Generation 102 generates models and profiles from training logs, based on different conditions. Model generation is the process of creating training profiles based on syntactic and semantic analysis. The regular expressions generated in 101, can be considered to be one of our models. All generated models are stored in a global model database (STEP 103), these can be later queried based on a time period to find the relevant model.

Global Model Database103 *i* is a global model database which keeps all the models generated over time Log Tokenization 201 provides a service to tokenize incoming raw log messages from user-facing applications/sensors or other instruments running production systems. In this step we query for log patterns from the global model database, and tokenize incoming log-streams into key-value pairs. The regular expression matching enables us to assign values for variable items in the message to different keys. These keys can be used as fields of a message, and the non-variable part of the message is considered static. Analytics in NGLA can be derived from either the semantic understanding of the field values, or relationships between patterns Log Management 202 layer manages the storage, and forwarding of log messages to various anomaly detectors in the next step. This step manages log forwarding, and stream transport of tokenized streams along with ID management of each message etc. This step is currently out of scope of this document.

Anomaly Detection 203 component provides a service for anomaly detection algorithms. The incoming tokenized streams are transformed into data-objects which can be easily used for anomaly detection. Anomaly Violation can be either semantic/syntactic or statistical. Analytics in NGLA is driven by this analysis component.

Anomaly Visualization 204 layer is the presentation layer of NGLA and visualizes the alerts to the user.

Figure 2:
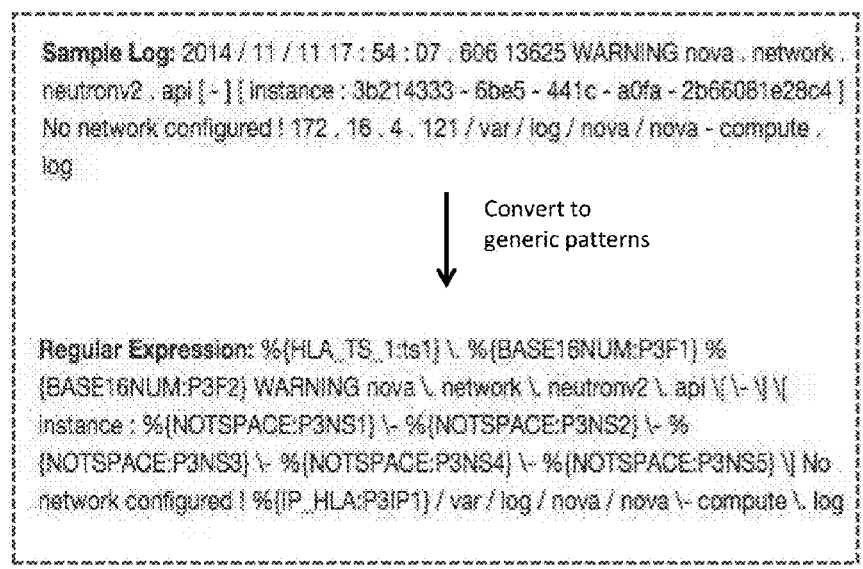
FIG. 2 shows in more details the operation of an exemplary pattern extraction

FIG. 2 shows in more details the operation of an exemplary pattern extraction done in operation 101. In this example, the sample log shown in Sample Log in FIG. 2 is converted to a regular expression. Exemplary key variables are as follows:

ts1→TimeStamp of the log
P3F1→Pattern 3 Field 1
P3NS1→Pattern 3 AlphaNumericField 1

This regular expression can then be stored in the global model database with the relevant training time-period. Regular Expressions can be used to tokenize logs in step 201.

Figure 3:
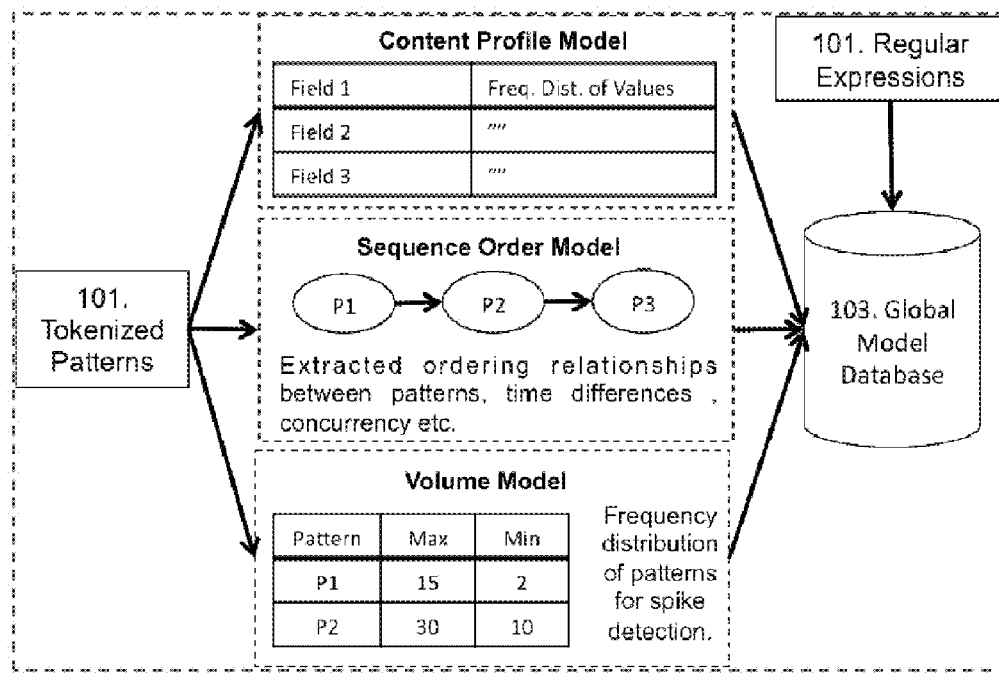
FIG. 3 shows an exemplary illustration of the model extraction process

FIG. 3 shows an exemplary illustration of the model extraction process (102). NGLA framework includes a platform for extracting a variety of profiles/models, which are aggregated together in a global model database. These models can be used later by anomaly detection service components to find relevant anomalies and alert the user. The workflow shown above uses log tokenization in the first step (101) as the input. Hence all training logs are broken down into key-value pairs, as described in (101).

FIG. 3 shows three possible models that can be generated. These three simply serve as an example of possible models that can be generated, however the architecture is not limited to them, and is meant to act as a service component for further such models.

a. Content Profile Model: This model looks creates a frequency profile of the various values for each key in the pattern/regular expression of a category of logs.
 b. Sequence Order Model: This model extracts sequential ordering relationships between various patterns. For instance an observed transaction could be defined as Pattern 1 could be followed by Pattern 2, with a maximum time difference of 10 seconds, and at max 3 such transactions can happen concurrently
 c. Volume Model: This model maintains a frequency distribution of the n.o. of logs of each pattern. It is then used for detecting unusual spikes of certain patterns and report them as alerts to the user.

Figure 4:
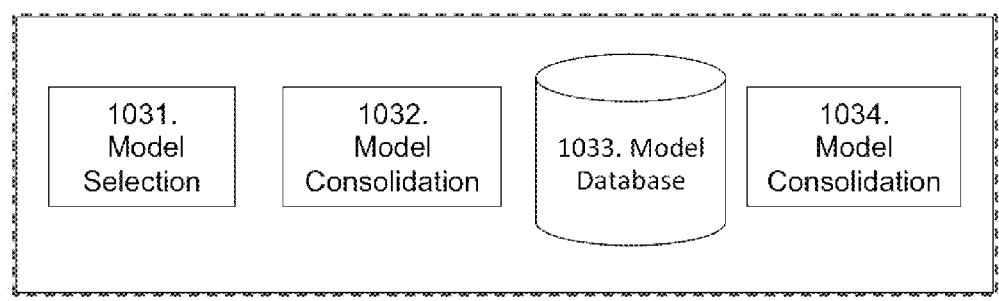
FIG. 4 shows an exemplary NGLA Global Model Database.

FIG. 4 shows an exemplary NGLA Global Model Database. The Global Model Database is a key component of NGLA. In practical real-world applications, learning is a continuous process. System behaviors change and evolve over time, because of changing workloads, new configuration, settings or even patches applied to the software. This in essence means that the models learnt must also be frequently updated.

Distributed learning and incremental learning are dependent on the model, and have been independently developed for each model. The global model database provides an interface to assist, and complement both these strategies to allow for a learning service, which can maintain its trained profiles in a database.

Based on this challenge, the following are the components of NGLA workflow:

Model Selection 1031 is a global model database component that supports simple queries such as select model, create new model, delete model. Model selection can be based on queries such as timestamp, sources, model category etc. Further there can be complex queries such as join, group, aggregate for grouping model categories, and aggregating models across different time ranges.

Model Consolidation 1032 is a component that deals with model-updates to support incremental or distributed learning processes. The update of the model themselves depends on the learning algorithm and the model profile. For instance our volume model can be easily updated using min/max and merging with them from the newer model.

The steps for Model Consolidation are as follows
 a. Query Model from database: Query the relevant model from the database
 b. Create New Model: Update the model using the new model from the current training data. This enables an iterative process of improving the model with newer training logs. Alternatively, it also allows for distributed learning over very large training logs.
 c. Save Model in the databases: The new model either needs to be updated or appended as a separate row in the model database.

Model Database 1033 uses a model database having a hierarchical schema with each model kept as follows:
  <TimeStamp, Time Range, Category, Source, Model>
  1. Timestamp—Time at which model is generated
  2. TimeRange—The time range of the training logs during which the model was created
  3. Category—The category of model
  4. Model—The model can be saved as a BLOB entry or a separate tables Service APIs 1034 supports the following Service API's:
 a. Distributed Learning: Large training log sessions may sometimes require distributed learning to speed up the learning process. This requires novel model consolidation process, which can lock/unlock updates to the global model database, and allow for update queries to existing models.
  b. Incremental Learning: Similar to distributed learning, models may be required to iteratively updated with newer training data from the next day.
  c. Query Models: At the time of testing querying model is a requirement this can be dependent on time-range, source etc.
  d. Model Database: A schema of a model management in a storage database.

Figure 5:
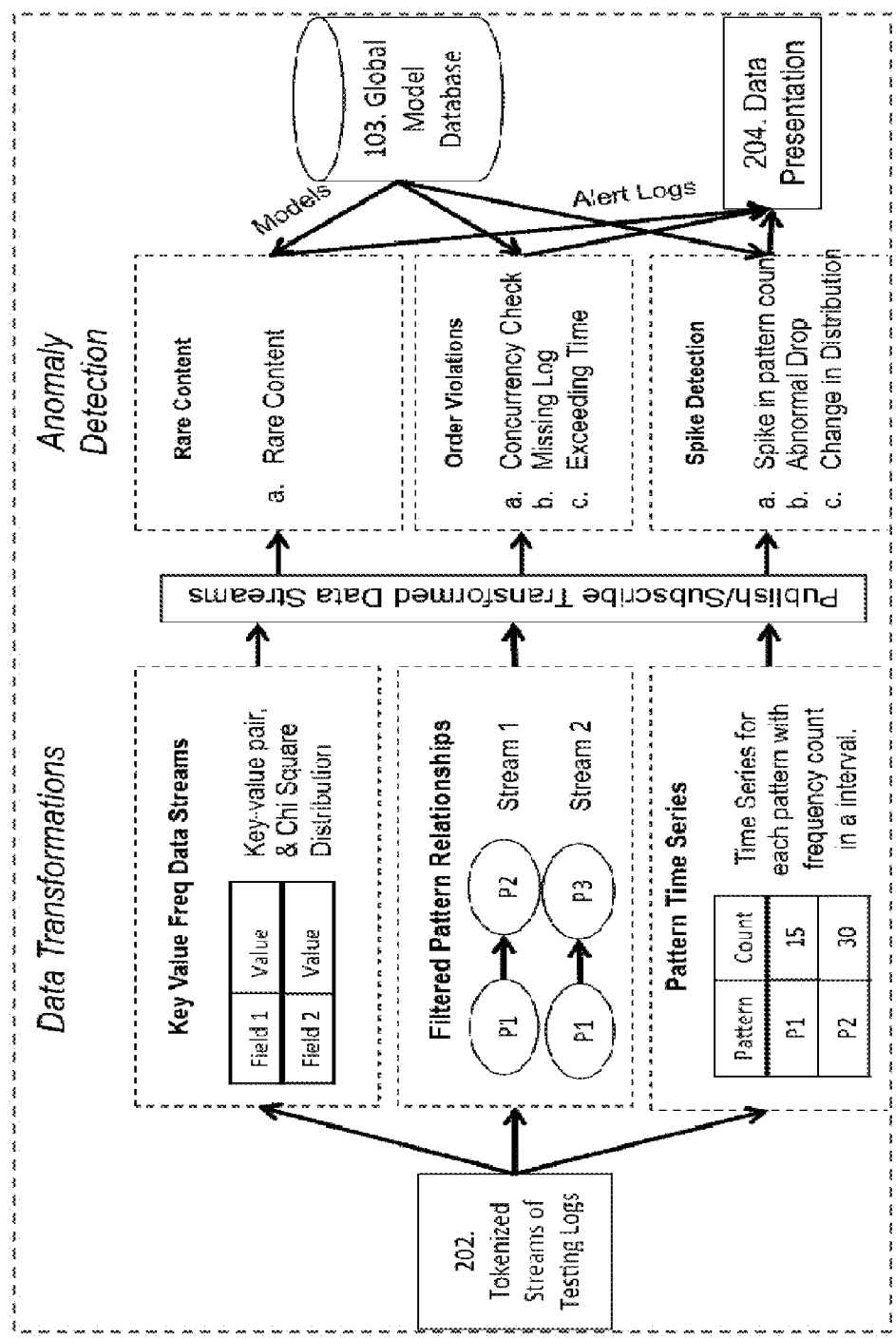
FIG. 5 shows exemplary Data Transformation and Anomaly Detection of tokenized log streams.

FIG. 5 shows exemplary Data Transformation and Anomaly Detection of tokenized log streams. In this example, 3 data-transformation streams and their corresponding anomaly detection algorithms are shown as examples. These only serve as examples for explanation, the architecture itself is extensible. The process of the analysis engine can be divided into two key phases similar to publish-subscribe architecture:
  a. Data Transformation: In this phase we transform incoming data streams into data-objects useful for common anomaly detection tasks. In FIG. 4, we have described some common data transformations. Depending on the anomaly detection that needs to be applied the relevant data-transformation object can be chosen. This greatly reduces redundant calculations for functionally similar transformations, and reduces the overall complexity and time-taken by NGLA for anomaly detection as well. Transformed data objects are pushed to a publish/subscribe system, which can then be subscribed to from anomaly detection.
  b. Anomaly Detection: The anomaly detection phase subscribes to transformed data-streams. It then applies violation/anomaly checking algorithms to check if the incoming transformed log-stream indicates an anomaly in the system.

Figure 6:
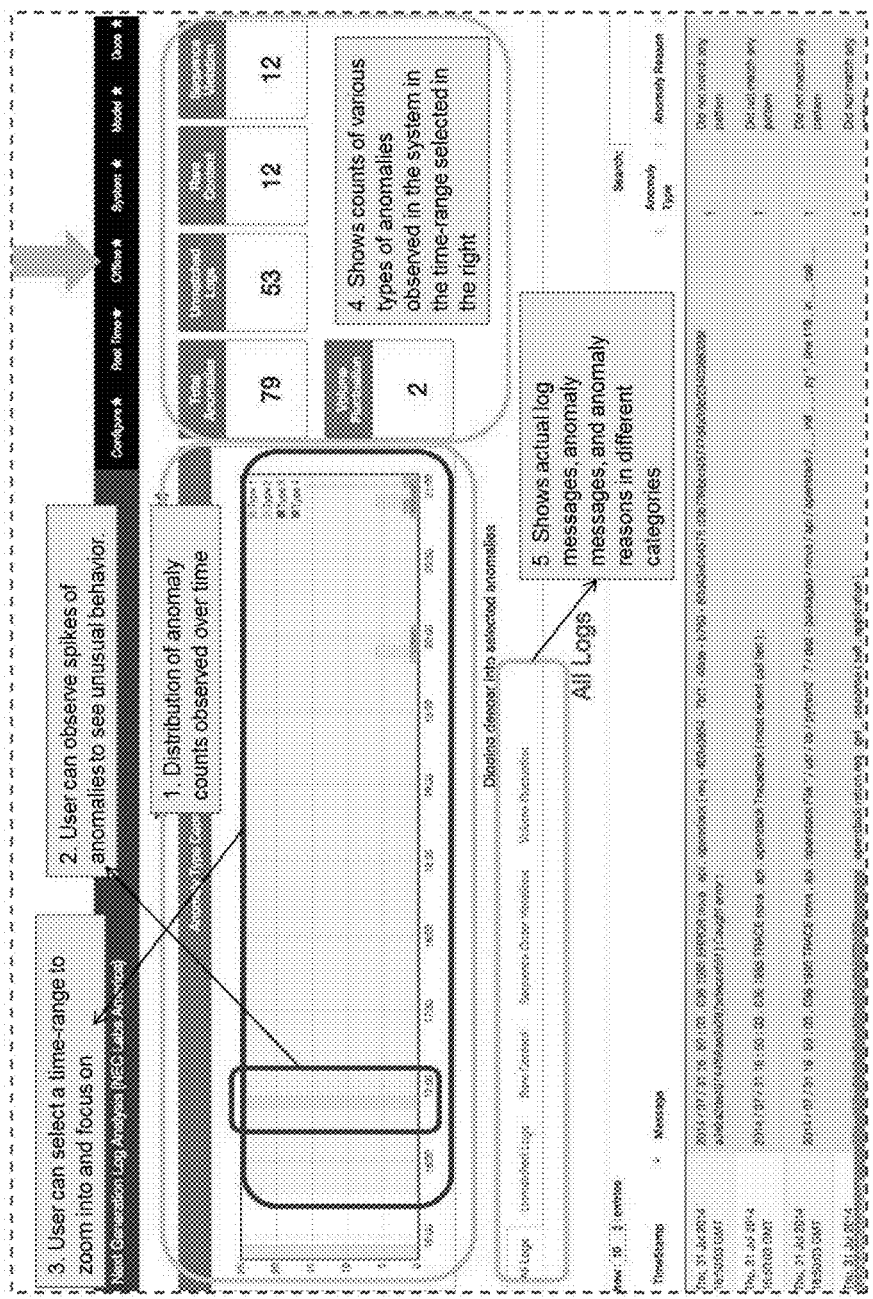
FIG. 6 shows a snapshot of an exemplary User Interface.

FIG. 6 shows a snapshot of an exemplary User Interface. NGLA has a visualization interface which allows for side-by-side view of anomalies. The snapshot shows that various different categories (Label 5 in FIG. 6) can be shown side by side, with the time stamp of the real-time alert (Label 1 in FIG. 6), the anomaly category and the reason for the anomaly. A real-time time-chart above shows spikes (Label 2 in FIG. 6) in anomalous logs, and the total count, and different counts of each anomalous category (Label 4 in FIG. 6).

Instead of simple storage and search, the system uses advanced analytics and machine-learning techniques. NGLA leverages unsupervised learning to learn regular expression patterns instead of requiring them from the user. NGLA involves:

1. An end-to-end workflow for advanced log analytics: This invention provides a workflow for how an input log can be transformed and various analytics can be applied by going through various training and testing stages.

2. A platform for advanced log analytics, which is scalable and adaptable. The NGLA platform allows a mechanism to easily plugin new analytics.

3. Global model database which allows users to save, maintain, query, and update trained models.

4. A publish-subscribe workflow for log object transformations

5. A side-by-side visual user-interface

Figure 7:
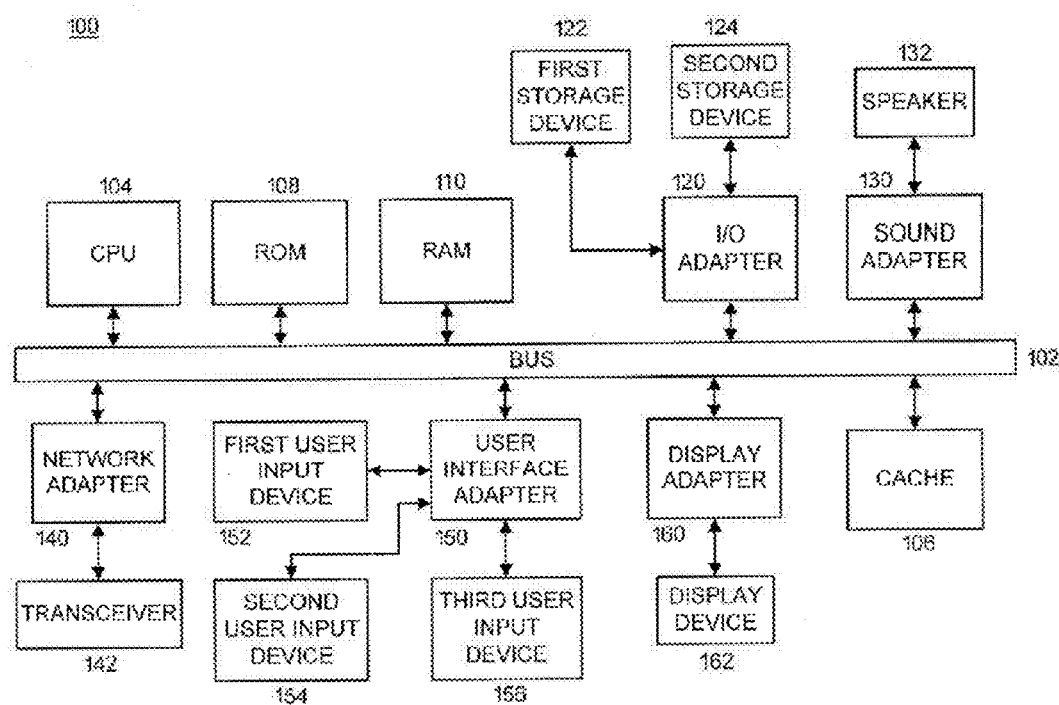
FIG. 7 shows an exemplary block diagram of hardware running the NGLA system.

Referring to the drawings in which like numerals represent the same or similar elements and initially to FIG. 7, a block diagram describing an exemplary processing system 100 to which the present principles may be applied is shown, according to an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to a system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to the system bus 102 by the sound adapter 130. A transceiver 142 is operatively coupled to the system bus 102 by a network adapter 140. A display device 162 is operatively coupled to the system bus 102 by a display adapter 160. A first user input device 152, a second user input device 154, and a third user input device 156 are operatively coupled to the system bus 102 by a user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used while maintaining the spirit of the present principles. The user input devices 152, 154, and 156 can be the same type of user input device or different types of user input devices. The user input devices 152, 154, and 156 are used to input and output information to and from the system 100.

Of course, the processing system 100 may also include other elements (not shown), as readily contemplated by one of skill in the art, as well as omit certain elements. For example, various other input devices and/or output devices can be included in the processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations, can also be utilized as readily appreciated by one of ordinary skill in the art. These and other variations of the processing system 100 are readily contemplated by one of ordinary skill in the art given the teachings of the present principles provided herein.

It should be understood that embodiments described herein may be entirely hardware, or may include both hardware and software elements which includes, but is not limited to, firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor, e.g., a hardware processor, coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method for handling log data from one or more applications, sensors or instruments, comprising:
   receiving heterogeneous logs from arbitrary/unknown systems or applications;
   generating regular expression patterns from the heterogeneous log sources using machine learning and extracting a log pattern therefrom;
   generating models and profiles from training logs based on different conditions and updating a global model database storing all models generated over time, wherein generating the models comprises generating sequence order model that extracts sequential ordering relationships between patterns and volume mode that maintains a frequency distribution of logs of each pattern and detecting unusual spikes of certain patterns and report the spikes as alerts;
   tokenizing raw log messages from one or more applications, sensors or instruments running a production system;
   transforming incoming tokenized streams are into data-objects for anomaly detection and forwarding of log messages to various anomaly detectors; and
   generating an anomaly alert from the one or more applications, sensors or instruments running a production system.

2. The method of claim 1, wherein each log message comprises a time stamp and text content.

3. The method of claim 1, comprising dividing data into training logs and testing logs.

4. The method of claim 1, wherein each anomaly violation comprises a semantic, syntactic or statistical violation.

5. The method of claim 1, comprising generating a visual alert to a user.

6. The method of claim 1, wherein the log pattern extraction generates a regular expression for the incoming logs using unsupervised learning.

7. The method of claim 1, wherein the log patterns have variable fields with a wildcard pattern and each fed has a key name attributed to known patterns and to unknown fields with generic names.

8. The method of claim 1, wherein generating the model comprises creating training profiles based on syntactic and semantic analysis.

9. The method of claim 1, comprising generating a Content Profile Model to create a frequency profile of various values for each key in a pattern or regular expression of a category of logs.

10. The method of claim 1, comprising performing distributed learning and incremental learning dependent on the model.

11. The method of claim 10, wherein the global model database provides an interface to assist, and to allow for a learning service which can maintain trained profiles in a database.

12. The method of claim 1, comprising selecting a model based on timestamp, sources, model category or based on complex queries including join, group, aggregate for grouping model categories, and aggregating models across different time ranges.

13. The method of claim 1, comprising performing model-updates to support incremental or distributed learning processes, wherein an update of the model depends on a learning algorithm and a model profile.

14. The method of claim 1, comprising forming a model database with a hierarchical schema and each model includes <TimeStamp, Time Range, Category, Source, Model>.

15. The method of claim 1, comprising transforming incoming data streams into data objects for common anomaly detection tasks.

16. The method of claim 15, comprising pushing transformed data objects to publish/subscribe module, and subscribing to the module for anomaly detection.

17. The method of claim 16, comprising applying violation or anomaly checking to check if an incoming transformed log-stream indicates an anomaly in the system.

18. A system comprising:
    a processor;
    a memory;
    an Internet-of-Thing (IoT) sensor providing data to the processor; and computer readable code executed by the processor to:
    receiving heterogeneous logs from arbitrary/unknown systems or applications;
    generating regular expression patterns from the heterogeneous log sources using machine learning and extracting a log pattern therefrom;
    generating models and profiles from training lope based on different conditions and updating a global model database storing all models generated over time, wherein generating the models comprises generating sequence order model that extracts sequential ordering relationships between patterns and volume model that maintains a frequency distribution of logs of each pattern and detecting unusual spikes of certain patterns and report the spikes as alerts;
    tokenizing raw log messages from one or more applications, sensors or instruments running a production system;
    transforming incoming tokenized streams are into data-objects for anomaly detection and forwarding of log messages to various anomaly detectors; and generating an anomaly alert from one or more applications, sensors or instruments running a production system.

\* \* \* \* \*